Oct. 7, 1930.                C. M. BERGMAN                1,777,545
                CURTAIN ADJUSTING MEANS FOR AUTOMOBILES
                         Filed March 30, 1927
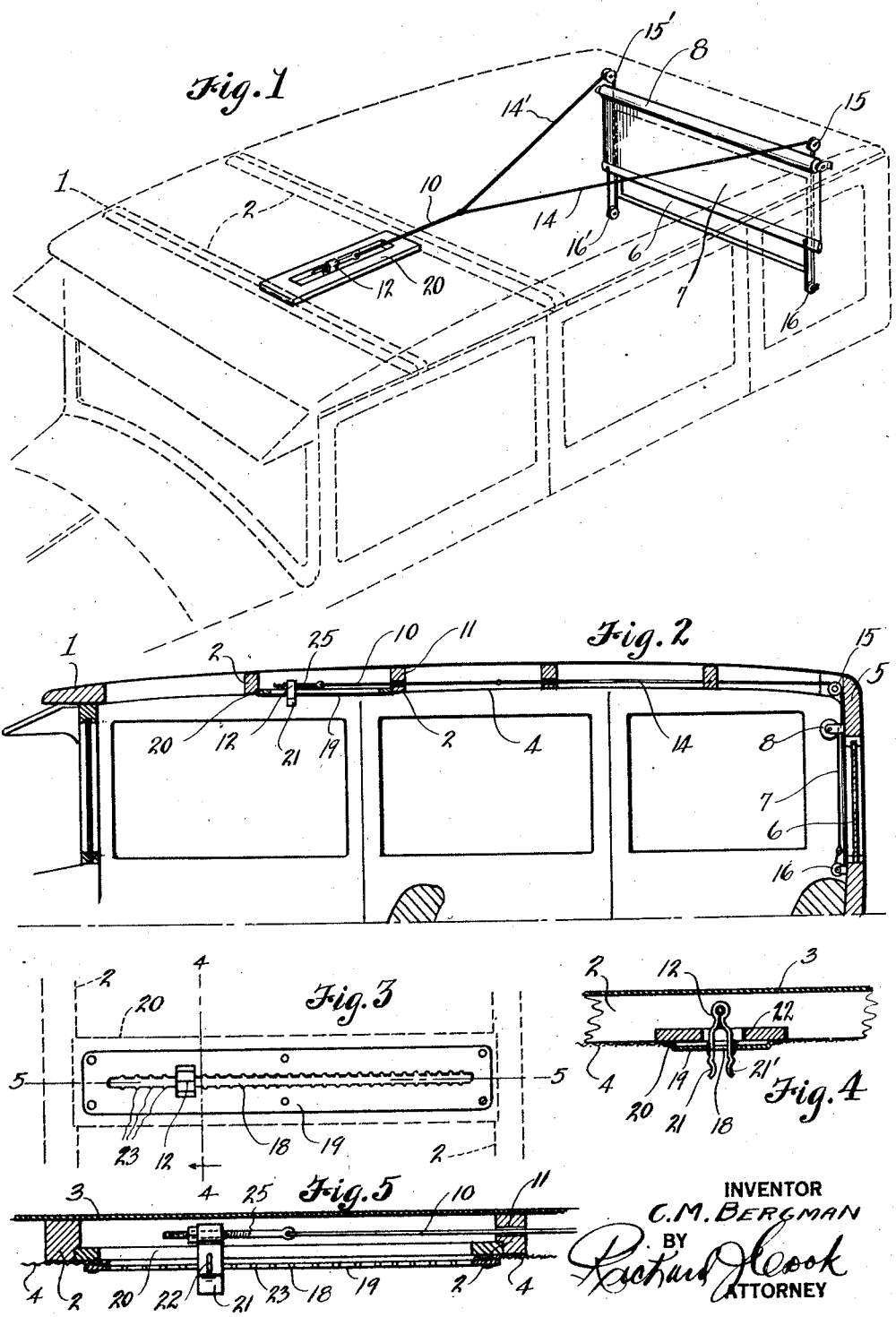

Patented Oct. 7, 1930

1,777,545

UNITED STATES PATENT OFFICE

CARL M. BERGMAN, OF TACOMA, WASHINGTON

CURTAIN-ADJUSTING MEANS FOR AUTOMOBILES

Application filed March 30, 1927. Serial No. 179,567.

This invention relates to an improvement in curtain adjusting devices, and more particularly to a device as used in automobiles, whereby the curtain for the rear window may be adjusted by a person in the driver's seat.

Explanatory to the invention, it will be stated here that automobile drivers, as a general rule, prefer that the curtain for the rear window be pulled down at night, so that the light from the headlights of a following vehicle shining through the window cannot be reflected by the windshield into their faces. Still, it is often desired to raise the curtain in order to observe traffic conditions at the rear or when parking or backing. When a driver is alone in a vehicle it is very difficult to make the desired curtain adjustments without stopping the car; this being especially true in vehicles of the coach or sedan type, where the distance from the driver's seat to the curtain is too far for the driver to reach.

In view of the above statement, it has been the principal object of this invention to provide means whereby a driver, or person, in the driver's seat, may easily and conveniently adjust the curtain of the rear window upwardly or downwardly as desired and may retain it in any desired position of adjustment.

More specifically stated, the object of the invention resides in the attaching of a cord, or cable, to the curtain and extending the cord over suitable guides, or pulleys, to a position easily accessible to the driver, so that he may, without turning from his position and without taking his attention from the business of driving, make any desired adjustment of the curtain.

Other objects of the invention reside in the various details of construction and combination of parts as hereinafter described.

In accomplishing these and other objects of the invention, I have provided the improved details of construction, the preferred forms of which are illustrated in the accompanying drawings, wherein—

Figure 1 is a perspective view, illustrating the application of a curtain adjusting means in accordance with the present invention; the outline of the vehicle body being shown in dotted lines for the purpose of better illustration.

Figure 2 is a sectional view taken lengthwise of the top of the vehicle, showing the disposition of the adjusting cables within the top.

Figure 3 is an underside view of the adjusting piece and its guide, and the manner of mounting the parts in the vehicle top.

Figure 4 is a cross section taken on the line 4—4 in Figure 3.

Figure 5 is a section on the line 5—5 in Figure 3.

Referring more in detail to the drawings—

1 designates, in its entirety, what may be the top of an automobile of the sedan or coach type and which comprises the bows 2 over which an outer covering 3 is placed and to which the inner lining 4 is attached. In the rear wall 5 of the vehicle top is a window 6 and supported from the wall is a curtain 7 which is mounted on the usual form of spring roller 8 which is revolubly supported at its ends and which operates to wind in the curtain when the catch thereon is released.

The preferred form of curtain adjusting means, embodied by this invention, comprises a cable 10 that is disposed centrally within the top between the outer cover 3 and the lining 4, and which passes through suitable openings 11 provided in the bows, or it may pass below or above the bows. At its forward end, the cable is attached to an adjusting clip 12, presently described in detail, and at its rearward end it is attached to two branch cables 14—14' which extend therefrom in laterally and rearwardly directed positions toward the opposite rear corners of the top, where they pass over guide rollers 15—15' and thence extend downwardly from the top and along the rear wall to points below the lower edge of the window and are then passed about guide rollers 16—16' and upwardly where they are attached to the end of the curtain near its opposite side edges. The adjusting piece 12 consists of an expandible spring clip that is slidably contained within a slot 18 that is formed lengthwise of the plate 19 mounted on a wooden block or the like 20 that is fixed lengthwise of the top between two of the adjacent bows 2. Preferably, this block would be located in the top at a point easily accessible to the right hand of the driver; however, this is not absolutely essential. The adjusting piece is formed from a piece of spring metal that is doubled upon itself and is then projected upwardly through the slot 18 with the two leg portions thereof pressing tightly against the edges of the slot and extending downwardly from the plate where they are provided with finger pieces 21—21' which may be grasped and pressed together so as to release the pressure of the legs against the edges of the slot to permit the piece to be adjusted. These legs of the clip may be provided with outwardly pressed ribs, as at 22, and the edges of the slot provided with closely spaced recesses 23 for receiving the ribs as a means of holding the clip against slippage after it has been adjusted to any position. The cable 10 is attached to the clip through the intermediacy of an adjustable bolt 25 which permits slack to be taken up, should this be necessary.

In using the device for adjusting the curtain, the driver or anyone to which the adjusting clip 12 is accessible, grasps the clip by the two finger pieces 21—21' and presses them together so as to release the hold of the leg portions of the clip from the edges of the slot in which it is contained; the clip is then moved rearwardly or forwardly as is required for adjusting the curtain, and, when the curtain is at a desired position, the clip is released so that the legs spring outwardly into holding contact with the plate. As the clip is moved forwardly, the cable 10 pulls forwardly on the two branch cables 14—14' and these pull downwardly on the ends of the curtain to unwind it from its roller. If it is desired to raise the curtain, the clip 12 is moved rearwardly and this releases the curtain so that the spring roller winds it up.

It is also to be understood that the adjusting clip 12 could be located at the side of the driver, or at the front of the car, below or above the windshield, and that the cable 10 could be extended over suitable guides to these various positions. Furthermore, the cable could be extended below the body and beneath the seats instead of through the top if this should be found more desirable.

It is to be understood that various details of construction would be changed to meet requirements in vehicles of different types and, for this reason, I do not wish to limit the claims only to the details of construction that are herein illustrated; it being the intention that the claims broadly cover the use of any means operable from the driver's seat, or which is accessible to persons in the driver's seat, to actuate the curtains of the rear window upwardly or downwardly.

Having thus described my invention, what I claim as new therein and desire to secure by Letters-Patent, is:

1. In an automobile, the combination with a spring roller carried shade having a pull cord, of a yieldable latch having said pull cord attached thereto, a guide plate provided with a slot containing the latch and along which the latch is adjustable to effect the adjustment of the curtain, said latch having an expanding tension whereby it is normally held in set position against the winding tendency of the spring roller.

2. In an automobile of the sedan type having a rear end window and a spring roller carried shade for the window, a pull cord attached to the shade and extended to a position accessible from the driver's seat of the vehicle, a holding mechanism for the cord adjustable to retain the curtain at various positions against the tension of the spring.

Signed at Tacoma, Pierce County, Washington this 18th day of March, 1927.

CARL M. BERGMAN.